(12) United States Patent
Muralt et al.

(10) Patent No.: US 7,031,378 B1
(45) Date of Patent: Apr. 18, 2006

(54) UNIFIED DSL TRANSCEIVER

(75) Inventors: Arnold Muralt, Fair Haven, NJ (US);
Christian Eichrodt, Newport Beach, CA (US)

(73) Assignee: Globespan, Inc., Red Bank, NJ (US)

( * ) Notice: Subject to any disclaimer, the term of this patent is extended or adjusted under 35 U.S.C. 154(b) by 931 days.

(21) Appl. No.: 09/888,735

(22) Filed: Jun. 25, 2001

Related U.S. Application Data (60) Provisional application No. 60/213,825, filed on Jun. 23, 2000.

(51) Int. Cl.
*H04B 1/38* (2006.01)
*H04L 5/16* (2006.01)

(52) U.S. Cl. ............... 375/219; 455/73; 710/1
(58) Field of Classification Search ........... 375/219, 375/257, 222, 295; 341/155
See application file for complete search history.

(56) References Cited

U.S. PATENT DOCUMENTS

| | | | | |
|---|---|---|---|---|
| 5,825,819 | A * | 10/1998 | Cogburn | 375/257 |
| 6,281,829 | B1 * | 8/2001 | Amrany et al. | 341/155 |
| 6,320,900 | B1 * | 11/2001 | Liu | 375/219 |
| 6,333,654 | B1 * | 12/2001 | Harris et al. | 327/170 |
| 6,385,234 | B1 * | 5/2002 | Ashley | 375/219 |
| 6,459,684 | B1 * | 10/2002 | Conroy et al. | 370/286 |
| 6,470,053 | B1 * | 10/2002 | Liu | 375/257 |
| 6,532,240 | B1 * | 3/2003 | Jeong | 370/465 |
| 6,556,581 | B1 * | 4/2003 | He et al. | 370/419 |
| 6,693,916 | B1 * | 2/2004 | Chaplik et al. | 370/485 |

OTHER PUBLICATIONS

Article entitled "Hybrid Analog/Digital Echo Cancellation Revisited (and Recycled)", dated Feb. 12, 1999 by Arnold Muralt; pp. 1-3.
Article entitled Copper CrossConnect™ A New Solution for the Competitive Local Loop by Turnstone White Paper, undated, pp. Cover-16.
Article entitled Draft New Recommendation G.992.1 "Asymmetrical Digital Subscriber Line (ADSL) Transceivers", dated Oct. 12-23, 1998 by International Telecommunication Union, pp. i and ii, 1-226.

\* cited by examiner

*Primary Examiner*—Stephen Chin
*Assistant Examiner*—Erin M. File
(74) *Attorney, Agent, or Firm*—Thomas, Kayden, Horstemeyer & Risley (57) ABSTRACT

A single unified digital subscriber line (DSL) transceiver can be used for DSL applications, can be integrated on a single board or chip, or within a less board space. An embodiment of the unified DSL transceiver comprises a transmit circuit coupled to a line driver/transformer circuit. The line driver/transformer circuit is coupled to a receive circuit that comprises a switching circuit. A signal is transmitted from the transmit circuit to the line driver/transformer circuit; the switching circuit is configured based on DSL applications, and the signal is propagated from the line driver/transformer circuit to a line.

15 Claims, 8 Drawing Sheets

UNIFIED DSL TRANSCEIVER

CROSS-REFERENCE TO RELATED APPLICATION(S)

This application claims the benefit of U.S. provisional application entitled, "Unified xDSL Transceiver and System Architecture for Symmetric and Asymmetric DSL Applications and Using Both Baseband and Pass Band Line Codes," having Ser. No. 60/213,825, filed Jun. 23, 2000, which is incorporated by reference herein in its entirety.

FIELD OF THE INVENTION

The present invention relates generally to transceivers and, more particularly, to a unified digital subscriber line (DSL) transceiver for symmetric and asymmetric DSL applications.

BACKGROUND OF THE INVENTION

With advancements in technology, faster data transmission rates and increased bandwidth are required. DSL technology has become an important tool in obtaining these requirements. Two different types of DSL applications are symmetric DSL (SDSL) applications and asymmetric DSL (ADSL) applications. Symmetric DSL applications are referred to as symmetric because they offer an inherently symmetric data rate. These applications generally use baseband codes such as 2BIQ, Optis, or Pulse Amplitude Modulation (PAM) that require a transmission of very low frequency signals. Although generally, SDSL applications frequently use a frequency band from low frequency to high frequency such as 80 kilohertz to 1.1 megahertz.

Asymmetric DSL applications are referred to as asymmetric because they offer an inherently non-symmetric data rate. ADSL applications have high data rates from a central office (CO) to a customer premise (CP) and low data rates from the CP to the CO.

Two different kinds of ADSL applications are asymmetric digital subscriber line over plain old telephone service (ADSL over POTS) applications and asymmetric digital subscriber line over integrated services digital network (ADSL over ISDN) applications. In ADSL over POTS applications, both ADSL and POTS services are provided on a single line. Similarly, in ADSL over ISDN applications, both ADSL and ISDN services are provided on the same line.

ADSL applications use pass band line codes that allocate a low frequency band to either POTS or ISDN. These applications do not use part of the frequency band used by POTS or ISDN. POTS uses a frequency band referred to as a voice band ranging approximately from 0 to 4 kilohertz. ISDN applications use a frequency band ranging from a low frequency to approximately 80 kilohertz.

Transceivers for ADSL and SDSL applications currently use different line interface circuits. As an example, transceivers for ADSL applications such as carrier amplitude/phase (CAP) modulation or discrete multi-tone (DMT) based ADSL, rate adaptive DSL (RADSL), currently use different transformers and associated components as compared to transceivers for SDSL applications such as ISDN DSL (IDSL), High-bit-rate DSL (HDSL), HDSL2, and single-pair high-bit-rate DSL (SHDSL). The use of different transformers and associated components requires more board space, is more expensive to install at the CO, and the CP can handle either ADSL or SDSL applications but not both. Hence, an unaddressed need exists in the industry for a unified DSL transceiver that can be integrated on a board, reduce the cost of installing and maintaining the various kinds of DSL services at the CO, and that can handle all types of DSL services at the CP.

SUMMARY OF THE INVENTION

The present invention provides a unified DSL transceiver. In addition, it provides a method for using a single transceiver for DSL applications.

Brief described, the unified DSL can be implemented as follows:

The unified DSL transceiver comprises a transmit circuit that is coupled to a line driver/transformer circuit. The line driver/transformer circuit is coupled to a receive circuit. Preferably, the receive circuit includes a switching circuit so that the unified DSL transceiver can be used for ADSL and SDSL applications. The transmit circuit is in turn, coupled to a transmit filter circuit. The receive circuit is coupled to a receive filter circuit.

The present invention also provides a method for using a single transceiver for DSL applications. In this regard, the method for using a single transceiver for DSL applications can be broadly summarized as follows: transmitting a signal from a transmit circuit to a line driver/transformer circuit, propagating the signal from the line driver/transformer circuit to a line, and configuring the switching circuit based on DSL applications. Furthermore, the method for using a single transceiver for DSL applications is summarized by the following steps: receiving a signal from a line into a line driver/transformer circuit, propagating the signal to a receive circuit that comprises a switching circuit, and configuring the switching circuit based on DSL applications.

Other features and advantages of the present invention will be or become apparent to one with skill in the art upon examination of the following drawings and detailed description. It is intended that all such additional features and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT(S)

Figure 1A:
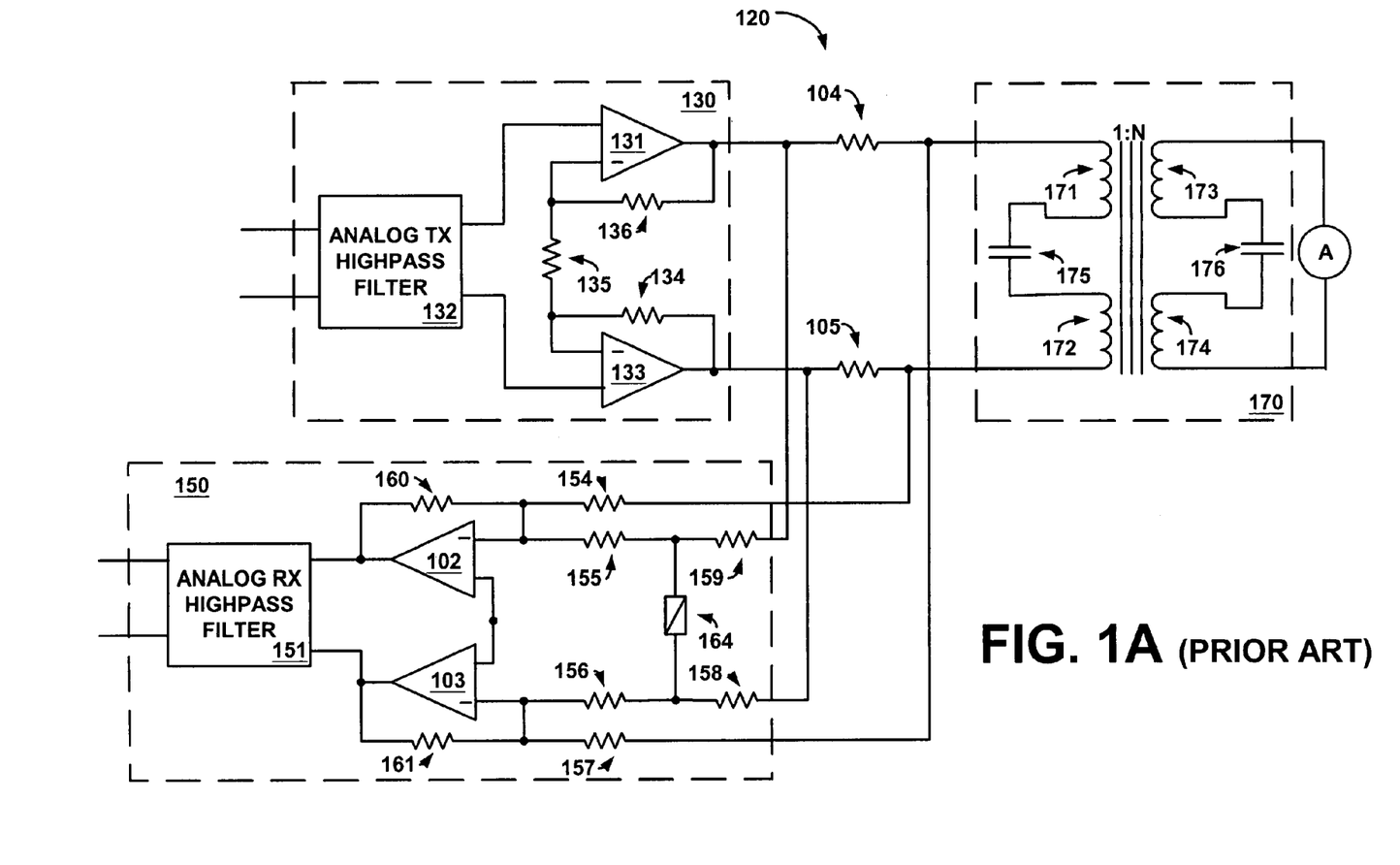
FIG. 1A is a diagram illustrating a conventional ADSL transceiver.
Figure 1B:
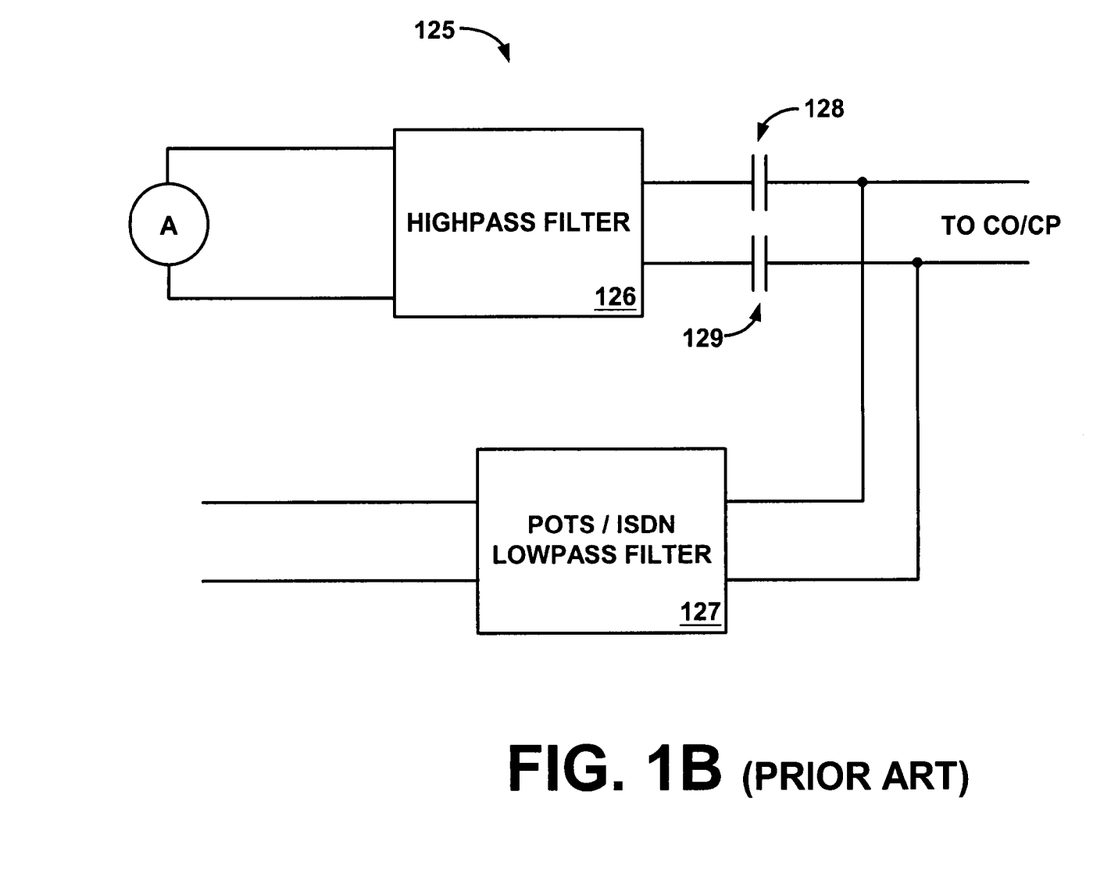
FIG. 1B is a block diagram illustrating a conventional POTS/ISDN splitter.
Figure 2:
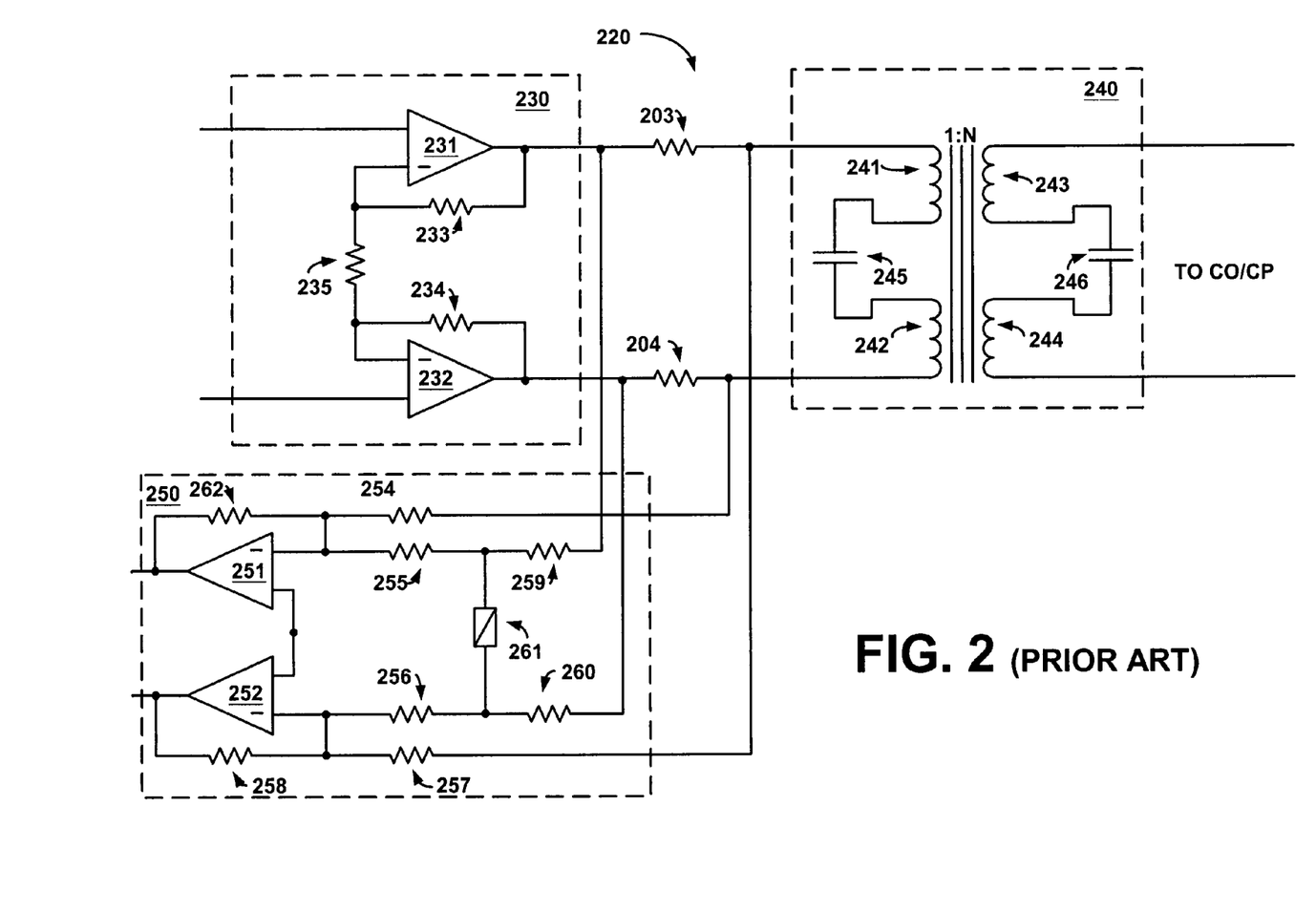
FIG. 2 is a diagram illustrating a conventional SDSL transceiver.

A description of FIGS. 1A, 1B, and 2 follows to show that ADSL and SDSL applications use two separate circuits, which are a first circuit and a second circuit. The first circuit is in FIG. 1A, is coupled to a POTS/ISDN splitter in FIG. 1B, and is used for ADSL applications. The second circuit is in FIG. 2 and is used for SDSL applications. Use of different transformers and associated components in separate circuits for SDSL and ADSL applications requires excessive board space, is expensive to install at the CO, and the CP is limited to being able to handle either ADSL or SDSL applications, but not both.

FIG. 1A is a diagram of a prior art ADSL transceiver 120. The ADSL transceiver 120 comprises a transmit portion 130, a receive portion 150, and a POTS highpass filter 170. The ADSL transceiver 120 also comprises two resistors, namely resistors 104 and 105. With reference to the transmit portion 130 of the ADSL transceiver 120, an analog transmit (TX) highpass filter 132 is provided. The analog TX highpass filter 132 has a first input and a second input. A first output of the analog TX highpass filter 132 is coupled to a non-inverting input of a transmit amplifier 131. An output of the transmit amplifier 131 is coupled to a first end of resistor 104. The output of the transmit amplifier 131 is also coupled to a second end of resistor 136. An inverting input of the transmit amplifier 131 is coupled to a first end of resistor 136 and to a first end of a resistor 135. A second end of the resistor 135 is coupled to a first end of a resistor 134 and to an inverting input of a transmit amplifier 133. A non-inverting input of the transmit amplifier 133 is coupled to a second output of the analog transmit highpass filter 132. An output of the transmit amplifier 133 is coupled to a second end of the resistor 134 and to a first end of a resistor 105.

The receive portion 150 of the ADSL transceiver 120 comprises an analog receive (RX) filter 151 that has a first input and a second input. A first output of the analog RX filter 151 is coupled to a first end of a resistor 160 and to an output of a receive amplifier 102. A second end of the resistor 160 is coupled to an inverting input of the receive amplifier 102, to a first end of a resistor 154, and to a first end of a resistor 155. A second end of the resistor 154 is coupled to a second end of the resistor 105. A second end of the resistor 155 is coupled to a first end of a resistor 159 and a first end of impedance 164. A second end of the resistor 159 is coupled to the first end of the resistor 104. A second output of the analog RX highpass filter 151 is coupled to an output of a receive amplifier 103, and to a first end of a resistor 161. An inverting input of the receive amplifier 103 is coupled to a first end of a resistor 156, a second end of the resistor 161, and a first end of a resistor 157. A noninverting input of the receive amplifier 102 is coupled to a noninverting input of the receive amplifier 103, and is generally maintained at a constant voltage. A second end of the resistor 156 is coupled to a second end of the impedance 164, and to a first end of a resistor 158. A second end of the resistor 158 is coupled to the first end of the resistor 105. A second end of the resistor 157 is coupled to a second end of the resistor 104.

The POTS highpass filter 170 comprises a first primary winding 171, a second primary winding 172, a first secondary winding 173, and a second secondary winding 174. A first end of the first primary winding 171 is coupled to the second end of the resistor 104. A second end of the first primary winding 171 is coupled to a blocking capacitor 175. A second end of the blocking capacitor 175 is coupled to a first end of the second primary winding 172, and a second end of the second primary winding 172 is coupled to the second end of the resistor 105. A second end of the first secondary winding 173 is coupled to a first end of a blocking capacitor 176. A second end of the blocking capacitor 176 is coupled to a first end of the second secondary winding 174. Turns ratio between the first primary winding 171 and the first secondary winding 173 is 1:N. Turns ratio between the second primary winding 172 and the second secondary winding 174 is also 1:N. Value of the blocking capacitor 175 could be $N^2$ times a value of the blocking capacitor 176.

FIG. 1B is a block diagram of a conventional POTS/ISDN splitter 125. The POTS/ISDN splitter 125 comprises a POTS/ISDN low pass filter 127 that has a first input and a second input. A first input of a highpass filter 126 is coupled to the first end of the first secondary winding 173 in the ADSL transceiver 120 shown in FIG. 1A. A second input of the highpass filter 126 is coupled to the second end of the second secondary winding 174 in the ADSL transceiver 120 of FIG. 1A. A first output of the highpass filter 126 is coupled to a first end of a capacitor 128. A second output of the highpass filter 126 is coupled to a first end of a capacitor 129. A second end of the capacitor 128 is coupled to a first output of the POTS/ISDN low pass filter 127 and connected to the CO or the CP. A second end of the capacitor 129 is coupled to a second output of the POTS/ISDN low pass filter 127 and to the CO or the CP.

FIG. 2 is a diagram of a conventional SDSL transceiver 220. The SDSL transceiver 220 comprises a transmit portion 230, a receive portion 250, and a line driver/transformer circuit 240. The transmit portion 230 comprises a transmit amplifier 231. An output of the transmit amplifier 231 is coupled to a second end of a resistor 233 and to a first end of a resistor 203. An inverting input of the transmit amplifier 231 is coupled to a first end of the resistor 233 and a first end of a resistor 235. A second end of the resistor 235 is coupled to a first end of a resistor 234, and to an inverting input of a transmit amplifier 232. Each of the transmit amplifier 232 and the transmit amplifier 231 have a noninverting input. A second end of the resistor 234 is coupled to an output of the transmit amplifier 232, and to a first end of a resistor 204.

The receive portion 250 comprises a receive amplifier 251. An output of the receive amplifier 251 is coupled to a first end of a resistor 262. A second end of the resistor 262 is coupled to an inverting input of the receive amplifier 251, to a first end of a resistor 254, and to a first end of a resistor 255. A second end of the resistor 254 is coupled to a second end of the resistor 204. A second end of the resistor 255 is coupled to a first end of a resistor 259, and to a first end of an impedance 261. A non-inverting input of the receive amplifier 251 and a non-inverting input of a receive amplifier 252 are generally maintained at a constant voltage. An output of the receive amplifier 252 is coupled to a first end of a resistor 258. An inverting input of the receive amplifier 252 is coupled to a second end of the resistor 258, a first end of a resistor 256, and a first end of a resistor 257. A second end of the resistor 257 is coupled to a second end of the resistor 203. A second end of the resistor 256 is coupled to a second end of the impedance 261, and to a first end of a resistor 260. A second end of the resistor 260 is coupled to the first end of the resistor 204.

The line driver/transformer circuit 240 comprises a first primary winding 241, a second primary winding 242, a first secondary winding 243, and a second secondary winding 244. A first end of the first primary winding 241 is coupled to the second end of the resistor 203. A second end of the first primary winding 241 is coupled to a first end of a blocking capacitor 245. A second end of the blocking 245 is coupled to a first end of the second primary winding 242. A second end of the second primary winding 242 is coupled to the second end of the resistor 204. A first end of the first secondary winding 243 and a second end of the second secondary winding 244 can be coupled to the CO or the CP. A second end of the first secondary winding 243 is coupled to a first end of a blocking capacitor 246. A second end of the blocking capacitor 246 is coupled to a first end of the second secondary winding 244. Turns ratio between the first primary winding 241 and the first secondary winding 243 is 1:N, which is also the turns ratio between the second primary winding 242 and the second secondary winding 244.

Use of different transformers and associated components for SDSL and ADSL applications typically requires excessive board space, is expensive to install at the CO, increases costs of switching between the SDSL and ADSL applications, and the CP is limited to being able to handle either ADSL or SDSL applications, but not both. The following further demonstrates the preceding point. The line driver/transformer circuit 240 in the SDSL transceiver 220 of FIG. 2 and the POTS highpass filter 170 in the ADSL transceiver 120 of FIG. 1A differ from each other. For instance, for SDSL applications using baseband line codes such as 2B1Q, Optis, or PAM, inductance of the first primary winding 241, the second primary winding 242, the first secondary winding 243, and the second secondary winding 244 in the SDSL transceiver 220 of FIG. 2, is approximately three millihenry. Furthermore, capacitance of the blocking capacitor 246 is approximately 0.56 microfarads. However, for ADSL applications over POTS using pass band line codes such as DMT or CAP, inductance of the first primary winding 171, the second primary winding 172, the first secondary winding 173, and the second secondary winding 174 in the ADSL transceiver 120 of FIG. 1A is approximately 450 microhenry. Moreover, capacitance of the blocking capacitor 176 in the ADSL transceiver 120 of FIG. 1A is approximately 0.033 microfarads. Additionally, for ADSL over ISDN applications using pass band codes such as DMT or CAP, inductance of the first primary winding 171, the second primary winding 172, the first secondary winding 173, and the second secondary winding 174 of FIG. 1A is approximately 130 microhenry. Having two separate circuits of the ADSL transceiver 120 for ADSL applications and the SDSL transceiver 220 for SDSL applications uses more board space, thereby making it difficult to fit the separate circuits on a single board. Still further, having two separate circuits increases costs of installing and maintaining various kinds of DSL services at the CO. Moreover, at the CP, generally, separate circuits are required to handle SDSL and ADSL applications. Lastly, switching between SDSL and ADSL applications generally requires a relay or other expensive means of switching, thereby increasing costs.

Figure 3:
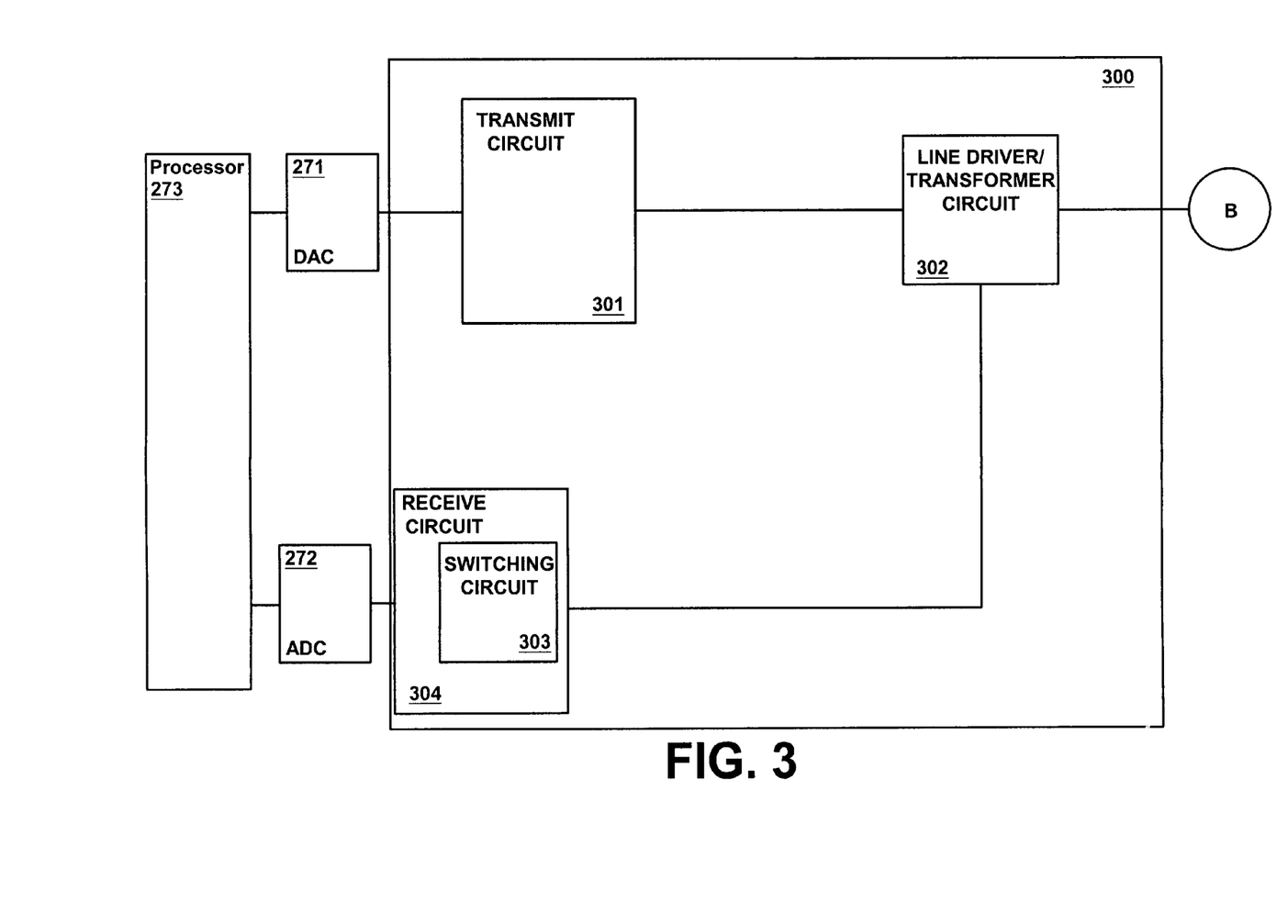
FIG. 3 is a block diagram illustrating the unified DSL transceiver, in accordance with an embodiment of the present invention.

FIG. 3 is a block diagram illustrating a unified DSL transceiver 300, in accordance with an embodiment of the invention. A transmit circuit 301 is coupled to a line driver/transformer circuit 302. The line driver/transformer circuit 302 is coupled to a receive circuit 304 that comprises a switching circuit (SC) 303. The line driver/transformer circuit 302 can be coupled via a transmission line including, but not limited to, a twisted-pair to a CO or a CP or it can be coupled to a POTS/ISDN splitter 500 shown in FIG. 5, which is described in detail hereinafter. The transmit circuit 301 can be coupled to a device, including but not limited to a DAC 271 that could be coupled to a processor 273. The receive circuit can be coupled to a device, including but not limited to, an ADC 272 that could be coupled to the processor 273.

A method for using a single transceiver for DSL applications follows. The processor 273 transmits a digital signal to the DAC 271. The DAC 271 converts the digital signal into an analog signal. The DAC 271 then transmits the analog signal to the transmit circuit 301. The transmit circuit 301 then transmits the analog signal to the line driver/transformer circuit 302. The line driver/transformer circuit 302 propagates the signal via the transmission line to a destination, such as, but not limited to, the CO or the CP. Alternatively, the line driver/transformer circuit 302 receives a signal via the transmission line from the CO or the CP. The line driver/transformer circuit 302 transmits the signal to the receive circuit 304 that further transmits the signal to the ADC 272. The ADC 272 converts the signal into a digital signal that is sent to the processor 273.

Figure 4A:
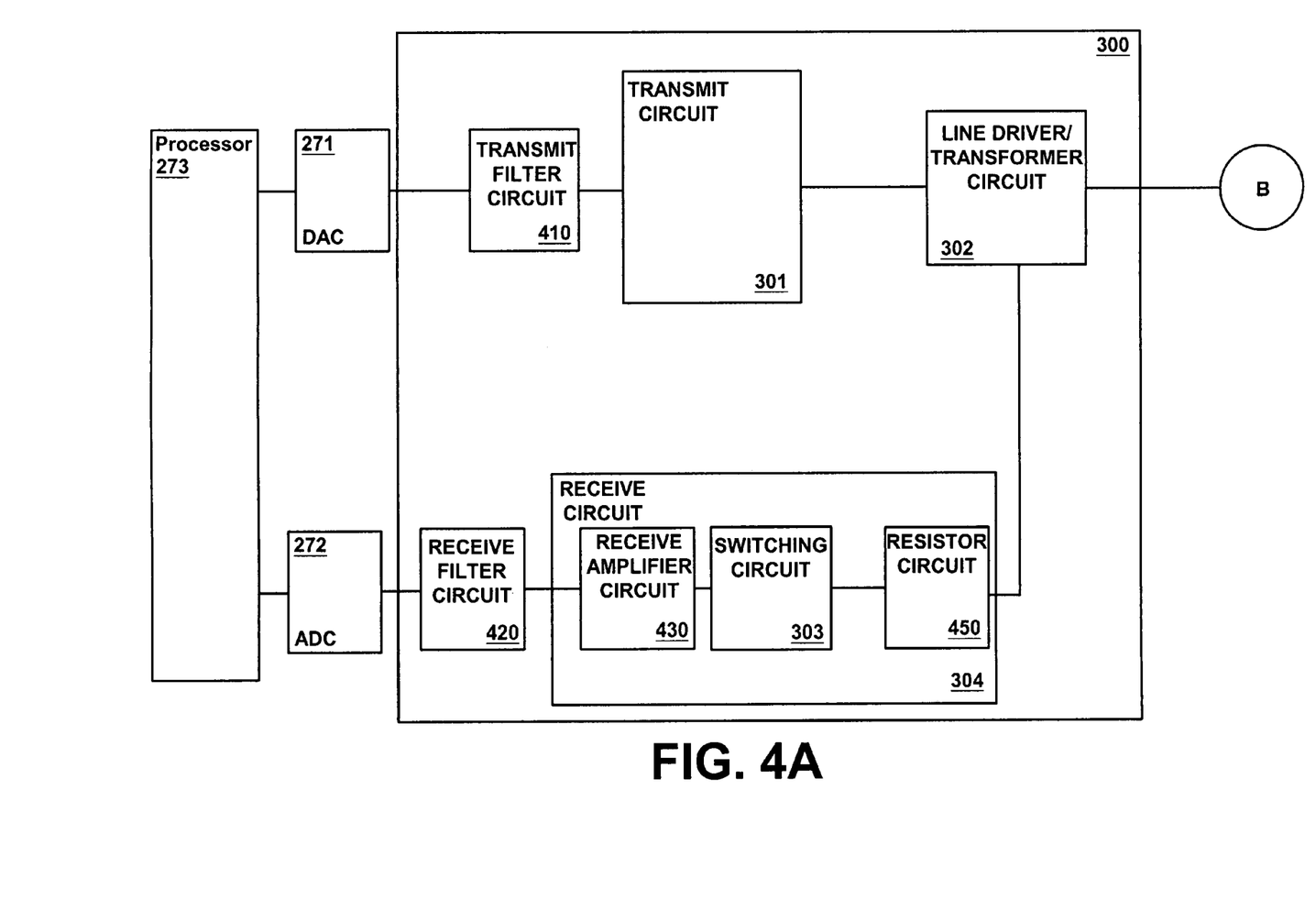
FIG. 4A is a diagram further illustrating the unified DSL transceiver of FIG. 3, in accordance with an embodiment of the invention.

FIG. 4A is a diagram in accordance with an embodiment of the invention, further illustrating the unified DSL transceiver 300 of FIG. 3. The unified DSL transceiver 300 comprises the line driver/transformer circuit 302, the transmit circuit 301, a transmit filter circuit 410, a receive filter circuit 420, and the receive circuit 304. The receive circuit 304 further comprises a receive amplifier circuit 430, the switching circuit 303, and a resistor circuit 450. The line driver/transformer circuit 302 is coupled to the transmit circuit 301 that is further coupled to the transmit filter circuit 410. The line driver/transformer circuit 302 is also coupled to the resistor circuit 450 that is further coupled to the switching circuit 303. The switching circuit 303 is coupled to the receive amplifier circuit (RAC) 430 that is coupled to the receive filter circuit 420. The transmit filter circuit 410 could be coupled to an electrical device including, but not limited to, the DAC 271 that could coupled to the processor 273. The receive filter circuit 420 could be coupled to an electrical device including, but not limited to, the ADC 272 that could be coupled to the processor 273.

Figure 4B:
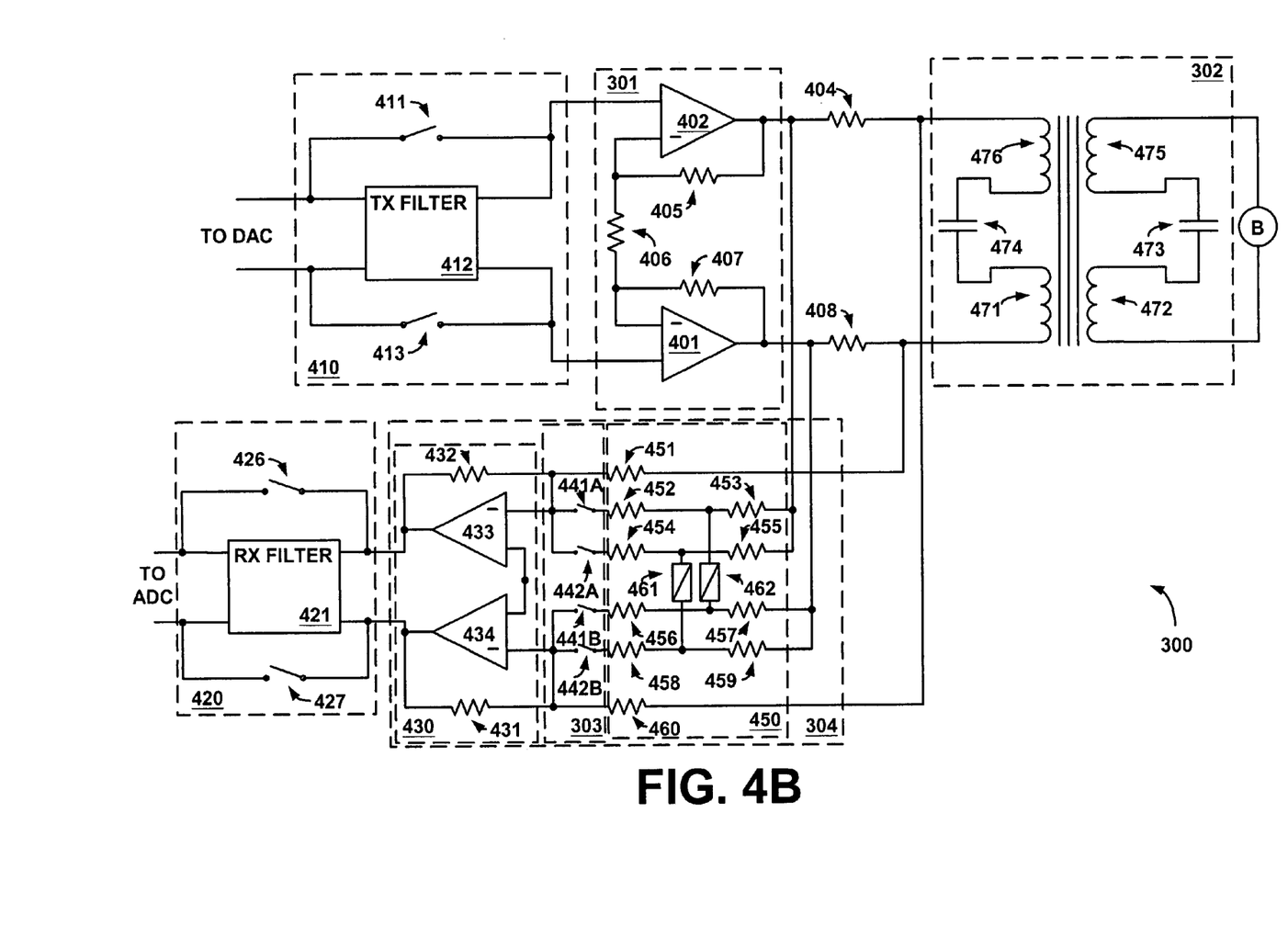
FIG. 4B is a diagram further illustrating the unified DSL transceiver of FIG. 4A, in accordance with an embodiment of the invention.

FIG. 4B is a diagram in accordance with an embodiment of the invention, further illustrating the unified DSL transceiver 300 of FIG. 4A. The unified DSL transceiver 300 comprises the line driver/transformer circuit 302 (FIG. 3), the transmit circuit 301 (FIG. 3), the transmit filter circuit 410 (FIG. 4A), the receive circuit 304 (FIG. 3), and the receive filter circuit 420 (FIG. 4A). The receive circuit 304 comprises the RAC 430 (FIG. 4A), the SC 303 (FIG. 3), and a resistor circuit 450 (FIG. 4A).

The line driver/transformer circuit 302 has four windings, a first primary winding 476, a second primary winding 471, a first secondary winding 475, and a second secondary winding 472. The line driver/transformer circuit 302 may have any number of primary windings and any number of secondary windings. A proposed range of inductance of the first primary winding 476, the second primary winding 471, the first secondary winding 475, and the second secondary winding 472 is between 2 millihenry and 12 millihenry. Generally, inductance of 3 millihenry is used. However, a larger inductance such as 12 millihenry may be used for inter-operability with legacy ISDN transceivers. A first end of the first secondary winding 475 and a second end of the second secondary winding 472 is coupled to for instance, a CO or a CP, or a splitter such as the flexible POTS/IDSN splitter 500 illustrated hereinafter by FIG. 5.

Turns ratio between the first primary winding 476 and the first secondary 475 winding is 1:n, where n is a number. Turns ratio between the second primary winding 471 and the second secondary winding 472 is also 1:n. However, the turns ratio between the second primary winding 471 and the second secondary winding 472 can be different from the turns ratio between the first primary winding 476 and the first secondary winding 475.

A first end of the first primary winding 476 is coupled to a second end of a resistor 404 and a second end of the first primary winding 476 is coupled to a first end of a blocking capacitor 474. A second end of the blocking capacitor 474 is coupled to a first end of the second primary winding 471. A second end of the second primary winding 471 is coupled to a second end of a resistor 408.

A second end of the first secondary winding 475 is coupled to a first end of a blocking capacitor 473. A second end of the blocking capacitor 473 is coupled to a first end of the second secondary winding 472. A proposed value of the blocking capacitor 473 is 0.56 microfarads, however, this value is not critical, so that a smaller or larger value can be considered. The value of the blocking capacitor 474 is $n^2$ times the value of the blocking capacitor 473, but smaller or larger values can be considered. It should be noted that the line driver/transformer circuit 302 may not comprise the blocking capacitors 473 and 474. The blocking capacitors 473 and 474 can be made of any dielectric material, including but not limited to a high dielectric, high voltage ceramic material, such as X7R, and any other materials known to people having ordinary skill in the art. A high voltage and temperature dependence of the dielectric material in the blocking capacitors 473 and 474 cannot cause problems. Higher linearity or stability than that offered by the X7R material is generally not required. The transmit circuit 301 comprises a transmit amplifier 402 having an output that is coupled to a first end of a resistor 404, and a second end of a resistor 405. An inverting input of the transmit amplifier 402 is coupled to a first end of the resistor 405 and a first end of a resistor 406. A second end of the resistor 406 is coupled to a first end of a resistor 407, and to an inverting input of a transmit amplifier 401 that is also located within the transmit circuit 301. An output of the transmit amplifier 401 is coupled to a first end of the resistor 408, and to a second end of the resistor 407.

The transmit filter circuit 410 comprises a TX filter 412. In accordance with an alternate embodiment of the invention, the transmit filter circuit 410 may not be included in the unified DSL transceiver 300. The TX filter 412 can be a low pass filter, a highpass filter, a band pass filter or any other filter known to people having ordinary skill in the art. For instance, when the unified DSL transceiver 300 is used at a CO, the TX filter 412 may be a highpass filter.

A first input of the TX filter 412 is coupled via a switch 411 to a non-inverting input of the transmit amplifier 402 located within the transmit circuit 301, and to a first output of the TX filter 412. A second input of the TX filter 412 is coupled via a switch 413 to a non-inverting input of the transmit amplifier 401, located within the transmit circuit 301, and to a second output of the TX filter 412. The first input and the second input of the TX filter 412 can be coupled to a device, including, but not limited to, the DAC 271 (FIG. 4A) that is coupled to the processor 273 (FIG. 4A).

The resistor circuit 450 comprises a resistor 451, wherein a second end of the resistor 451 is coupled to the second end of the resistor 408 and a second end of a resistor 452 is coupled to a first end of a resistor 453. The second end of the resistor 452 is coupled via matching impedance 462 to a first end of the resistor 457 and a second end of a resistor 456. A second end of the resistor 453 is coupled to a second end of the resistor 455, and to the first end of the resistor 404.

A second end of a resistor 460 is coupled to the second end of the resistor 404. A second end of the resistor 458 is coupled to a first end of resistor 459. The second end of the resistor 458 is coupled via a matching impedance 461 to a second end of the resistor 454 and a first end of a resistor 455. The second end of the resistor 458 is also coupled to a first end of the resistor 459. A second end of the resistor 457 is coupled to the first end of the resistor 408, and a second end of the resistor 459.

The SC 303 comprises switches 441A–442A, 441B–442B. A first end of the switch 441A is coupled to a second end of a resistor 432, a first end of the resistor 451, and a first end of the switch 442A. A second end of the switch 441A is coupled to a first end of the resistor 452. A second end of the switch 442A is coupled to a first end of the resistor 454.

A first end of a switch 441B is coupled to a second end of a resistor 431, a first end of the resistor 460, and a first end of a switch 442B. A second end of the switch 441B is coupled to a first end of the resistor 456. A second end of the switch 442B is coupled to a first end of the resistor 458. The switches 441A, 442A, 441B, 442B, 411, 413, 426, 427 can be implemented using electrical components, including but not limited to, MOSFETs, relays or any other electrical components known to people having ordinary skill in the art.

The RAC 430 comprises a receive amplifier 433 having an inverting input that is coupled to the first end of the switch 441A. A non-inverting input of the receive amplifier 433 is coupled to a non-inverting input of a receive amplifier 434. An output of the receive amplifier 433 is coupled to a first end of the resistor 432. An inverting input of the receive amplifier 434 is coupled to the first end of the switch 442B. An output of the receive amplifier 434 is coupled to a first end of the resistor 431. The non-inverting input of the receive amplifier 433 and the receive amplifier 434 are generally maintained at a constant voltage. A value of the constant voltage is between zero and a voltage supplied to the unified DSL transceiver 300.

The constant voltage at the non-inverting input of the receive amplifier 433 biases the switches 441A, 442A, 441B and 442B with the constant voltage. Therefore, the on resistance of the switches 441A, 442A, 441B, and 442B will be virtually signal independent, and no distortion will be created by a non-linearity of the on resistance of the switches 441A, 442A, 441B and 442B. To explain, a MOSFET is a non-linear device. In other words, voltage-to-current characteristics of MOSFET are non-linear and so a MOSFET produces a non-linear signal in response to a change in a voltage applied to the MOSFET. A voltage drop across any of the switches 441A, 442A, 441B and 442B should be small since the on resistance of the switches 441A, 442A, 441B and 442B is small, thereby rendering both ends of any of the switches to be at a same voltage to make the switches 441A, 442A, 441B and 442B independent of a signal. However, a variable voltage can also be applied to the non-inverting input of the receive amplifier 433.

The receive filter circuit 420 comprises a RX filter 421. In an alternative embodiment of the unified DSL transceiver 300, the unified DSL transceiver 300 may not comprise the receive filter circuit 420. The RX filter 421 can be any filter, including but not limited to, a low pass, highpass, a band pass filter, or any other filter known to people having ordinary skill in the art. For instance, when the unified DSL transceiver 300 is used at the CO, the RX filter 421 should be a low pass filter.

A first input of the RX filter 421 is coupled via a switch 426 to a first output of the RX filter 421. A second input of the RX filter 421 is coupled via a switch 427 to a second output of the RX filter 431. The first output of the RX filter 421 is coupled to the output of the receive amplifier 433. The second output of the RX filter 421 is coupled to the output of the receive amplifier 434. The first input and the second input of the RX filter 421 can be coupled to a device, for instance, the ADC 272 (FIG. 4A) that is coupled to the processor 273 (FIG. 4A).

The RX filter 421 provides a first order cancellation of an echo. There is a simultaneously transmission and reception of a signal because of a limited frequency bandwidth. Therefore, a receive signal receives part of a transmit signal known as an echo. The RX filter 421 provides a first order cancellation of the echo from the receive signal.

A proper subtraction of the echo from the receive signal depends upon whether or not the receive circuit 304 is configured based on an impedance seen by the unified DSL transceiver 300. Impedance seen by the unified DSL transceiver 300 changes based on whether it is used for ADSL applications or SDSL applications. Furthermore, if the unified DSL transceiver 300 can be implemented partially in a digital domain, an adaptive algorithm can be used to estimate the echo, and the DAC 271 (FIG. 4A) can be used to generate an analog representation of the echo, which can then be subtracted in the receive circuit 304.

A description of functionality of the embodiment of the unified DSL transceiver 300 of FIG. 4B follows. A transmit signal is sent from the processor 273 (FIG. 4A) to the DAC 271 (FIG. 4A) that converts the transmit signal from a digital format to an analog format. The transmit signal is further transmitted to the transmit filter circuit 410 in which the TX filter 412 could filter the transmit signal to remove undesirable components in the transmit signal or alternately, the switches 411 and 413 could be closed so that the transmit signal can bypass the TX filter 412. The transmit circuit 301 then amplifies the transmit signal that is further propagated to the line driver/transformer circuit 302. The line driver/transformer circuit 302 increases, decreases, or maintains the voltage of the transmit signal that is then sent to the CO or the CP. The transmit signal in the unified DSL transceiver 300 could be a signal related to ADSL over POTS applications, or SDSL applications.

Alternatively, or simultaneous to transmission of the transmit signal, the line driver/transformer circuit 302 receives a receive signal from the CO or the CP and increases, decreases, or maintains the voltage of the receive signal. The resistors 404 and 408 sense the receive signal. When the transmit signal is transmitted simultaneous to reception of the receive signal, there is a first order cancellation of the transmit signal from the receive signal since the receive circuit 304 receives both the transmit signal and the receive signal. The resistor circuit 450 performs the first order cancellation. The RAC 430 amplifies the receive signal that is sent to the receive filter circuit 420 in which the RX filter 421 filters undesirable components in the receive signal. Alternately, the switches 426 and 427 in the receive filter circuit 420 could be closed so that the receive signal can bypass the RX filter 421. The ADC 272 (FIG. 4A) receives the receive signal and converts the receive signal from an analog format to a digital format. The receive signal in the unified DSL transceiver 300 could be a signal for ADSL over POTS applications, or SDSL applications.

Furthermore, a description of the functionality of the SC 430 in the unified transceiver 300 follows. When switches 441A and 441B are closed and simultaneously switches 442A and 442B are open, the unified DSL transceiver 300 can be used for ADSL over POTS applications. Alternatively, when the switches 442A and 442B are closed and simultaneously the switches 441A and 441B are open, the unified DSL transceiver 300 can be used for SDSL applications. Moreover, the switches 426–427, 411 and 413 in the unified DSL transceiver 300 are open in case of ADSL over POTS applications. Alternatively, the switches 426–427, 411 and 413 are closed for SDSL applications, thereby bypassing the TX filter 412 and the RX filter 421.

It should be noted that instead of the two impedances 461 and 462, a single impedance could be provided with an electrical device for adjusting the impedance to implement different transfer functions that relate to SDSL, and ADSL over POTS applications. Other implementations of the unified DSL transceiver 300 do not make impedances 461 and 462 and the resistors 451–460 in the resistor circuit 450, but comprise of electrical devices including, but not limited to, capacitors, or resistors that implement the different transfer functions. Furthermore, the other implementations also comprise of a switching device including, but not limited to, a switch that switches between the different transfer functions. In another embodiment of the unified DSL transceiver 300, the receive circuit 450 could comprise electrical devices including, but not limited to, resistors, or capacitors, that implements a single transfer function that relates to the SDSL, and ADSL over POTS applications. Additionally, the receive circuit 450 in the alternative embodiment could comprise a switching device, including, but not limited to, a switch, which could adjust the single transfer function according to SDSL, or ADSL over POTS applications.

Figure 4C:
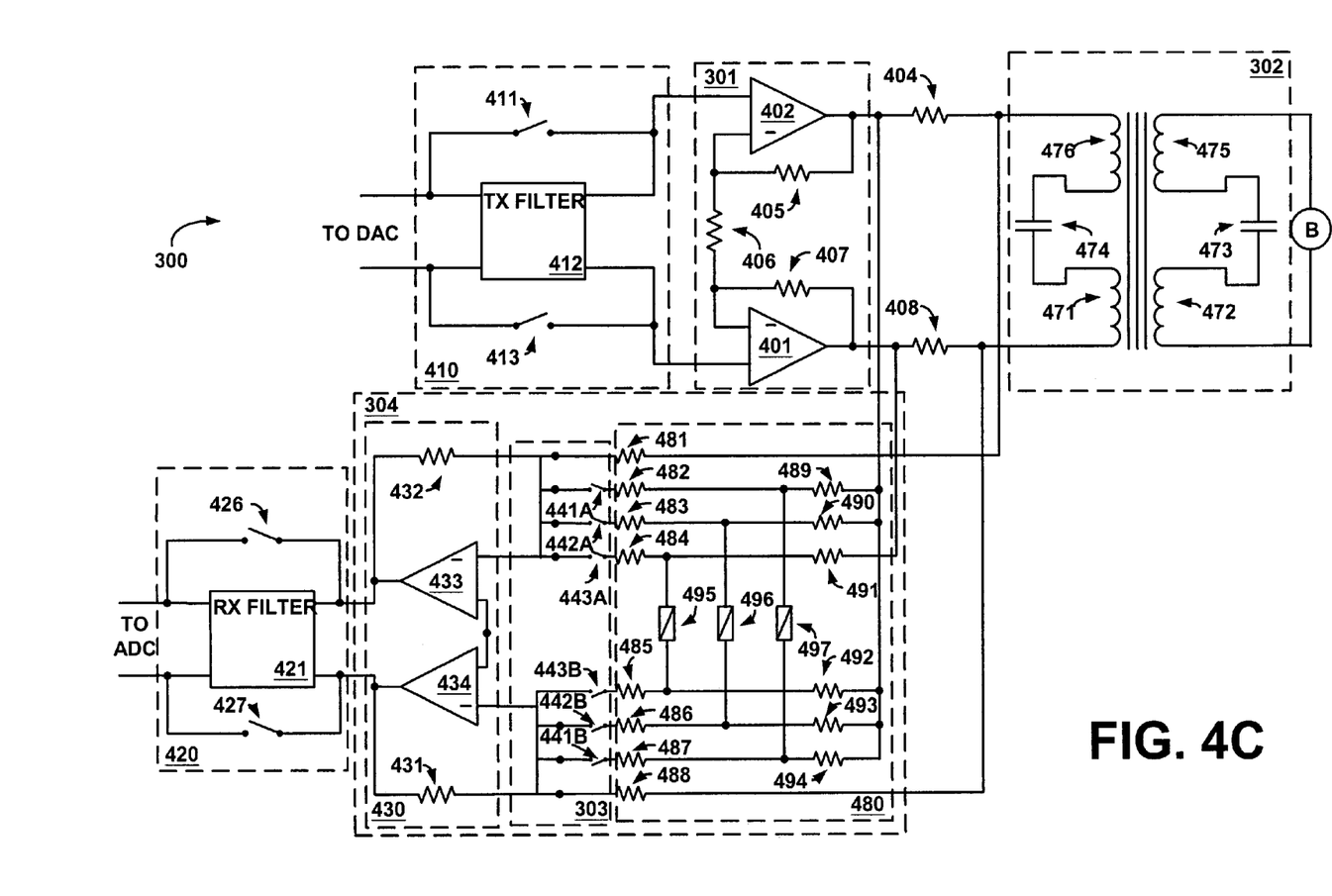
FIG. 4C is a diagram further illustrating the unified DSL transceiver of FIG. 4A, in accordance with a preferred embodiment of the invention.

FIG. 4C is a diagram further illustrating the unified DSL transceiver 300 of FIG. 4A, in accordance with the preferred embodiment of the invention. The unified DSL transceiver 300 comprises the transmit filter circuit 410, the transmit circuit 301, resistors 404 and 408, the line driver/transformer circuit 302, the receive filter circuit 420, and the RAC 430. A detailed description of the transmit filter circuit 410, the transmit circuit 301, the resistors 404 and 408, the line driver/transformer circuit 302, the receive filter circuit 420, and the RAC 430 was provided above when describing FIG. 4B, and therefore need not be described again. However, it should be noted that a transmit signal in the unified DSL transceiver in FIG. 4C could be a signal for ADSL over POTS, ADSL over ISDN, or SDSL applications. Moreover, a receive signal in the unified DSL transceiver in FIG. 4C could be a signal for ADSL over POTS, ADSL over ISDN, and SDSL applications. Additionally, the resistor circuit 480 functions to provide a first order cancellation of the transmit signal from the receive signal.

The receive circuit 304 of the unified DSL transceiver 300 in FIG. 4C comprises the SC 303, and the resistor circuit 450. The SC 303 comprises a switch 441A. A first end of the switch 441A is coupled to a first end of a switch 442A and to a first end of a switch 443A. The first end of the switch 441A is also coupled to the inverting input of the receive amplifier 433. Furthermore, the first end of the switch 441A is coupled to a second end of the resistor 432, and a first end of a resistor 481. A second end of the switch 441A is coupled to a first end of a resistor 482. A second end of the switch 442A is coupled to a first end of a resistor 483. A second end of the switch 443A is coupled to a first end of a resistor 484.

A first end of a switch 441B is coupled to a second end of the resistor 431 and to a first end of a resistor 488. The first end of the switch 441B is also coupled to a first end of a switch 442B and to a first end of a switch 443B. Furthermore, the first end of the switch 441B is coupled to an inverting input of the receive amplifier 434. A second end of the switch 443B is coupled to a first end of a resistor 485. A second end of the switch 442B is coupled to a first end of a resistor 486. A second end of the switch 441B is coupled to a first end of a resistor 487. The switches 441A–443A, 441B–443B can be implemented using electrical components, including but not limited to, MOSFETs, relays or any other electrical components known to people having ordinary skill in the art.

The resistor circuit 480 comprises the resistor 481 whose second end is coupled to the second end of the resistor 404. A second end of the resistor 482 is coupled to a first end of an impedance 497 and to a first end of a resistor 489. A second end of the resistor 483 is coupled to a first end of an impedance 496 and to a first end of a resistor 490. A second end of the resistor 484 is coupled to a first end of an impedance 495 and to a first end of a resistor 491. A second end of the resistor 489 and a second end of the resistor 490 is coupled to the first end of the resistor 404. A second end of the resistor 491 is coupled to the first end of the resistor 408. A second end of the resistor 488 is coupled to the second end of the resistor 408. A second end of the resistor 487 is coupled to a second end of the impedance 497 and to a first end of a resistor 494. A second end of the resistor 486 is coupled to a second end of the impedance 496 and to a first end of a resistor 493. A second end of the resistor 485 is coupled to a second end of the impedance 495 and to a first end of a resistor 492. A second end of the resistor 492, a second end of the resistor 493, and a second end of the resistor 494 are coupled to the first end of the resistor 404.

It should be noted that instead of the three impedances 495–497, a single impedance could be provided with an electrical device for adjusting the impedance to implement different transfer functions that relate to SDSL and ADSL applications. Other implementations of the unified DSL transceiver 300 are possible that do not make comprise impedances 495–497 and the resistors 481–494 in the resistor circuit 450, but comprise of electrical devices including, but not limited to, capacitors, or resistors that implement the different transfer functions. Furthermore, the other implementations also comprise of a switching device including, but not limited to, a switch that switches between the different transfer functions. In another embodiment of the unified DSL transceiver 300, the receive circuit 450 could comprise electrical devices including, but not limited to, resistors, or capacitors, that implements a single transfer function that relates to the SDSL and ADSL applications. Additionally, the receive circuit 450 in that alternative embodiment could comprise a switching device, including, but not limited to, a switch, which could adjust the single transfer function according to SDSL or ADSL applications.

A detailed description of functionality performed by the unified DSL transceiver 300 follows. When switches 441A and 441B are closed and simultaneously switches 442A, 442B, 443A, and 443B are open, the unified DSL transceiver 300 can be used for ADSL over POTS applications. Alternatively, when the switches 442A and 442B are closed and simultaneously the switches 441A, 441B, 443A, 443B are opened, the unified DSL transceiver 300 can be used for SDSL applications. When the switches 443A and 443B are closed and simultaneously the switches 441A, 441B, 442A, 442B are opened, the unified DSL transceiver 300 can be used for ADSL over IDSN applications. Moreover, the switches 411, 413, and 426–427 are open in case of ADSL over POTS or ADSL over ISDN applications. Alternatively, the switches 411, 413, 426–427 are closed for SDSL applications, thereby bypassing the TX filter 412 and the RX filter 421.

The unified DSL transceiver 300 should abide by certain standards. One of those standards is the ITU G992.1 standard, which is incorporated by reference herein in its entirety. The ITU G.992.1 standard provides the input impedance requirements for ADSL over POTS applications and ADSL over ISDN applications related to the unified DSL transceiver 300. Input impedance comprises a real portion and an imaginary portion as is known by people having ordinary skill in the art. Imaginary portion of input impedance for ADSL over POTS applications at a frequency of 4 kilohertz ranges from 1.1 to 2 kiloohms. A corresponding range of the blocking capacitor 473 of FIGS. 4B and 4C is 27–34 nanofarads. The imaginary portion of the input impedance increases monotonically below a frequency of 4 kilohertz. For ISDN applications, a value of the blocking capacitor 473 (FIGS. 4B and 4C) is 8.2 nanofarads.

The ITU G.992.1 standard also provides the power spectral density (PSD) requirements for the ADSL over POTS and ADSL over ISDN applications related to the unified DSL transceiver 300. The PSD requirement for ADSL over POTS applications for frequencies ranging between 0 and 4 kilohertz is −97.5 dBm/Hz. The PSD requirement of −97.5 dBm/Hz means that there should be a power reading equal to or lower than −97.5 dBm for every one hertz of frequency range between frequencies of 0 and 4 kilohertz. A maximum power within frequencies between 0 and 4 kilohertz is 15 dBm. Furthermore, for frequencies between 4 kilohertz and 25.875 kilohertz, the PSD requirement is provided by the following equation:

$$-92.5+21\times\log_2(\text{frequency}/4)\,\text{dBm/Hz}. \quad (\text{Eq. 1})$$

The PSD requirement for ADSL over ISDN applications for frequencies ranging between 0 and 70 kilohertz is −90 dBm/Hz. The PSD requirement for frequencies ranging from 50 kilohertz to 90 kilohertz is provided by the following equation:

$$-90+12\times\log_2(F/F1), \quad (\text{Eq. 2})$$

where F is a frequency that ranges between 0 and 70 kilohertz and F1 is a frequency that ranges between 50 kilohertz and 90 kilohertz. It should be noted that the ITU G.992.1 standard does not provide attenuation requirements for POTS or ISDN signals in a receive direction.

The TX filter 412 and the RX filter 421 in the unified DSL transceiver 300 (FIGS. 4B and 4C) help achieve the PSD requirements. The TX filter 412 and the RX filter 421 can be analog or digital depending upon a dynamic range of other elements such as the DAC 271 (FIG. 4A), the ADC, or a smoothing filter in the path of a signal in the unified DSL transceiver 300. To explain, whether or not the TX filter 412 is needed depends upon a resolution of the DAC. If the DAC 271 (FIG. 4A) does not have a sufficiently high resolution, without the TX filter 412, there is a risk of the signal having too many low frequency components. Therefore, including the TX filter 412 in the unified DSL transceiver 300 reduces the low frequency components, thereby improving a low frequency noise of the unified DSL transceiver 300. Similarly, whether or not the RX filter 421 should be included in the unified DSL transceiver 300 is a design decision to reduce the low frequency components if the ADC 272 (FIG. 4A) does not have a sufficiently high resolution. Hence, the TX filter 412 and the RX filter 421 in the unified DSL transceiver 300 help achieve the PSD requirements.

Furthermore, the line driver/transformer circuit 302 of FIGS. 3, 4A, 4B, and 4C acts as a highpass filter that satisfies the input impedance requirements, the PSD requirements, and the attenuation requirements. The inductance of the line driver/transformer circuit 302 and values of the blocking capacitors 473 and 474 (FIGS. 4B and 4C) define a cut off frequency of the highpass filter.

A first purpose of the highpass filter is to help the unified DSL transceiver 300 meet the input impedance requirements by presenting high impedance within POTS or ISDN band in case of ADSL applications using pass band line codes, or present high impedance to block direct currents (DC) in case of SDSL applications using baseband line codes. To explain, in absence of the highpass filter; one service probably can short-circuit the transmission line, thereby rendering another service inoperable. For instance, in absence of the highpass filter, an ADSL over POTS application will probably short-circuit a POTS or an ISDN application. Hence, the highpass filter provides sufficiently high impedance within a POTS or ISDN band to prevent a short circuit by the ADSL application.

A second purpose of the highpass filter is to help the unified DSL transceiver 300 achieve the PSD requirements by attenuating any low frequency signals generated in the unified DSL transceiver 300 that otherwise would interfere with POTS or ISDN operation. To explain, the unified DSL transceiver 300 cannot transmit signals in a frequency band that is used by an existing service. For instance, the unified DSL transceiver 300 cannot transmit voice band signals since the voice band signals would interfere with signals in the POTS band. The highpass filter attenuates the voice band signals generated in the unified DSL transceiver 300 that interfere with the signals in the POTS band. A third purpose of the highpass filter is to help the unified DSL transceiver 300 achieve the attenuation requirements by rejecting low frequency POTS or ISDN signals that would otherwise saturate the unified DSL transceiver 300.

Figure 5:
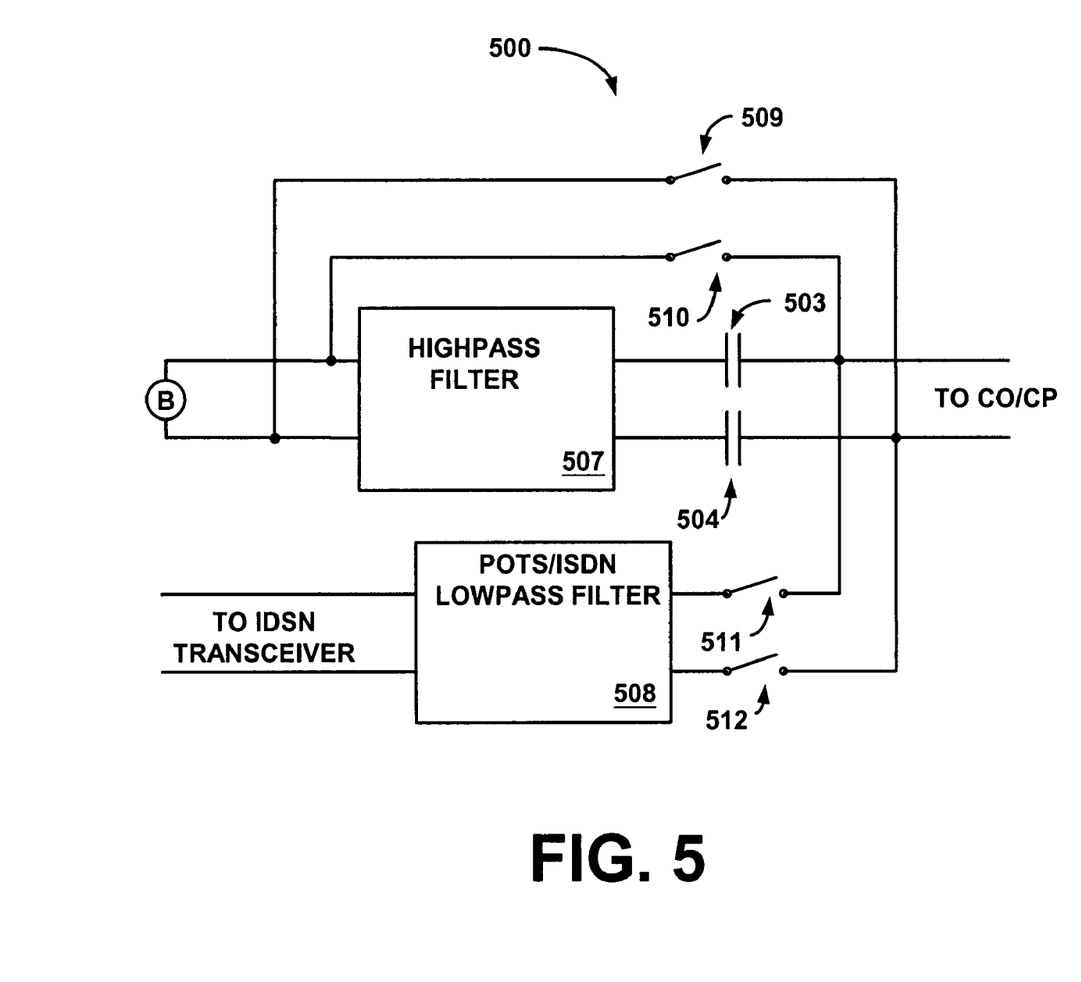
FIG. 5 is a block diagram of a flexible POTS/ISDN splitter, which may be connected to the unified DSL transceiver of FIGS. 3, 4A, 4B, and 4C.

FIG. 5 is a block diagram of the flexible POTS/ISDN splitter 500, which may be connected to the unified DSL transceiver 300 of FIGS. 3, 4A, 4B, and 4C. Generally, the flexible POTS/ISDN splitter 500 is installed in conjunction with the unified DSL transceiver 300 if a line also has a POTS or an ISDN signal. The flexible POTS/ISDN splitter 500 can also include the line driver/transformer circuit 302 (FIGS. 3, 4A–4C). The flexible POTS/ISDN splitter 500 comprises a POTS/ISDN low pass filter 508. A first input and a second input of the POTS/ISDN low pass filter 508 is coupled to a device, including but not limited to an ISDN transceiver, for removing signals transmitted from the device and received by the device. The signals could be signals related to ADSL and SDSL applications. A first output of the POTS/ISDN low pass filter 508 is coupled to a first end of a switch 511. A second end of the switch 511 is coupled to a second end of a capacitor 503 and a second end of a switch 510. A second output of the POTS/ISDN low pass filter 508 is coupled to a first end of a switch 512. A second end of the switch 512 is coupled to a second end of a capacitor 504 and a second end of a switch 509.

The switches 509–512 can be implemented using electrical components, including but not limited to, MOSFETs, relays or any other electrical components known to people having ordinary skill in the art. Furthermore, the switches 511 and 512 are closed and simultaneously the switches 509 and 510 are open for ADSL over POTS and ADSL over ISDN applications. Alternatively, the switches 509 and 510 are closed and simultaneously the switches 511 and 512 are open for SDSL applications.

A first input of an highpass filter 507 is coupled to a first end of the switch 510, and the first end of the first secondary winding 475 in the line driver/transformer circuit 302 of FIGS. 4B, and 4C. A second input of the highpass filter 507 is coupled to a first end of the switch 509, and the second end of the second secondary winding 472 of FIGS. 4B and 4C. A first output of the highpass filter 507 is coupled to a first end of the capacitor 503. A second output of the highpass filter 507 is coupled to a first end of the capacitor 504. The second end of the capacitor 503 and the second end of the capacitor 504 are coupled via a transmission line to the CO or the CP.

The highpass filter 507 removes POTS or ISDN signals from a transmit signal that the unified DSL transceiver 300 transmits, and from a receive signal that the unified DSL transceiver 300 receives. If the unified DSL transceiver 300 in FIG. 4B is used in conjunction with the flexible POTS/ISDN splitter 500 in FIG. 5, the transmit signal and the receive signal are signals related to ADSL over POTS applications and SDSL applications. Alternately, if the unified DSL transceiver 300 in FIG. 4C is connected to the flexible POTS/ISDN splitter 500 in FIG. 5, the transmit signal and the receive signal are signals related to ADSL over POTS applications, ADSL over ISDN applications, and SDSL applications.

The flexible POTS/ISDN splitter 500 may not comprise the highpass filter 507. Whether or not the highpass filter 507 is required is application specific. The highpass filter 507 will probably not be required for ADSL over POTS applications. By properly choosing values of the coupling capacitors 503 and 504 and inductance of the line driver/transformer circuit 302 (FIGS. 3, 4A–4C), a sufficient attenuation for interfering POTS signals can be achieved. For ADSL over ISDN applications, the highpass filter 507 can reduce the dynamic range in the unified DSL transceiver 300. In other words, the highpass filter 507 can help fulfill input impedance requirements, PSD requirements, and attenuation requirements.

Initially, it may be unknown whether a customer is interested in an SDSL application or in an ADSL application. If the unified DSL transceiver 300 is preinstalled, the customer can call an operator and subscribe to an SDSL service, or an ADSL service. The operator can then remotely configure the unified DSL transceiver 300 using, for instance, a digital signal processor, and provide the customer with a service requested. Preferably, a digital signal processor controls the switches 441A–443A, 441B–443B, 411, 413, and 426–427 in the unified DSL transceiver 300 of FIG. 4C, and the switches 509–512 in the flexible POTS/ISDN splitter 500 of FIG. 5. For instance, when a customer subscribes to a service for ADSL over ISDN applications, the digital signal processor executes an algorithm that closes the switches 443A, 443B, and simultaneously opens the switches 441A, 441B, 442A, 442B, 411, 413, 426–427 in the unified DSL transceiver 300 of FIG. 4C. Furthermore, the digital signal processor closes the switches 511, 512 and simultaneously opens the switches 509 and 510 in the flexible POTS/ISDN splitter 500 of FIG. 5. However, any other device that controls all switches in the preferred embodiment of the unified DSL transceiver 300 and the flexible POTS/ISDN splitter 500 and known to people having ordinary skill in the art can be used. Thus, the unified DSL transceiver 300 can be configured on demand for ADSL applications and SDSL applications, thereby eliminating a need for separate circuits for symmetric and ADSL applications that are shown in FIGS. 1A, 1B and 2.

Furthermore, the unified DSL transceiver 300 significantly reduces costs of installing and maintaining various kinds of DSL applications at the CO since the unified DSL transceiver 300 can handle SDSL applications, as well as ADSL applications. Moreover, at the CP, the unified DSL transceiver 300 can handle all types of DSL applications. Impedance seen by the unified DSL transceiver 300 depends upon a value of the coupling capacitors 503 and 504 of FIG. 5. Hybrid characteristics of the unified DSL transceiver 300 can be adjusted to achieve a good transhybrid loss such as greater than or equal to 25 dB with an american wire gauge number 24 (AWG24) and american wire gauge number 26 (AWG26) loops without bridged taps. A good transhybrid loss can be achieved by configuring the unified DSL transceiver 300 for ADSL and SDSL applications depending upon the impedance seen by the unified DSL transceiver 300. Hence, the unified DSL transceiver 300 reduces the costs associated with various kinds of DSL. Additionally, the unified DSL transceiver 300 can also be integrated on a single board or chip, or within a lesser board space as compared to the separate circuits required for SDSL and ADSL applications.

It should be noted that the TX filter 412, the RX filter 421 of FIGS. 4B and 4C, the POTS/ISDN low pass filter 508, and the highpass filter 507 of FIG. 5 can be analog or can be implemented digitally using a digital signal processor. In other words, the TX filter 412, the RX filter 431, the POTS/ISDN filter 508, and the highpass filter 507 can be implemented in hardware, software, firmware, or a combination thereof. The TX filter 412 and the RX filter 421 in the unified DSL transceiver of FIGS. 4B and 4C may alternately be implemented in software or firmware that is stored in a memory and that is executed by a suitable instruction execution system. If implemented in hardware, as has been shown by FIGS. 4B and 4C, the TX filter 412 and the RX filter 421 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Furthermore, it should be noted that the values of all the devices in FIGS. 1A–5 are for illustration only. Any values known to people having ordinary skill in the art can be used instead of the values provided by the ITU G.992.1 standard.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A unified digital subscriber line (DSL) transceiver, comprising:
   a transmit circuit coupled to a line driver/transformer circuit;
   a receive circuit coupled to the line driver/transformer circuit, the receive circuit comprising a switching circuit, the switching circuit enabling operation of the DSL transceiver for DSL applications; and
   a transmit filter circuit, wherein the transmit filter circuit is coupled to the transmit circuit for filtering undesirable components in asymmetric DSL (ADSL) signals that pass through the unified DSL transceiver, the transmit filter circuit coupled to the transmit circuit for bypassing symmetric DSL (SDSL) signals that pass through the unified DSL transceiver.

2. The unified DSL transceiver of claim 1, wherein the DSL applications comprise symmetric DSL (SDSL) applications, and asymmetric DSL (ADSL) applications.

3. The unified DSL transceiver of claim 2, wherein the SDSL applications are selected from a group consisting of integrated services digital network (ISDN), ISDN DSL (IDSL), high-bit-rate DSL (HDSL), HDSL2 and single-pair high-bit-rate DSL (SHDSL) applications.

4. The unified DSL transceiver of claim 2, wherein the ADSL applications are selected from a group consisting of ADSL over plain old telephone service (POTS) applications, and ADSL over integrated services digital network (ISDN) applications.

5. The unified DSL transceiver of claim 1, wherein the switching circuit comprises at least one switch.

6. The unified DSL transceiver of claim 1, wherein a plain old telephone service/integrated services digital network (POTS/ISDN) splitter is coupled to the line driver/transformer circuit.

7. The unified DSL transceiver of claim 6, wherein the POTS/ISDN splitter comprises:
   a POTS/ISDN low pass filter for filtering asymmetric DSL (ADSL) signals that pass through the unified DSL transceiver; and
   a highpass filter for filtering POTS and ISDN signals that pass through the unified DSL transceiver.

8. The unified DSL transceiver of claim 1, wherein the transmit filter circuit further comprises a transmit (TX) filter for filtering the undesirable components in the ADSL signals that pass through the unified DSL transceiver.

9. The unified DSL transceiver of claim 1, wherein a receive filter circuit is coupled to the receive circuit for filtering undesirable components in asymmetric DSL (ADSL) signals that pass through the unified DSL transceiver, the receive filter circuit coupled to the receive circuit for bypassing symmetric DSL (SDSL) signals that pass through the unified DSL transceiver.

10. The unified DSL transceiver of claim 9, wherein the receive filter circuit comprises a receive (RX) filter for filtering the undesirable components in the ADSL signals that pass through the unified DSL transceiver.

11. The unified DSL transceiver of claim 1, wherein a transmit filter circuit is coupled to the transmit circuit for filtering undesirable components in asymmetric DSL (ADSL) signals that pass through the unified DSL transceiver, the transmit filter circuit coupled to the transmit circuit for bypassing symmetric DSL (SDSL) signals that pass through the unified DSL transceiver; and
   a receive filter circuit is coupled to the receive circuit for filtering the undesirable components in the ADSL signals that pass through the unified DSL transceiver, the receive filter circuit coupled to the receive circuit for bypassing the SDSL signals that pass through the unified DSL transceiver.

12. A method for using a single transceiver for digital subscriber line (DSL) applications, comprising the steps of:

receiving a signal into a line driver/transformer circuit, the line driver/transformer circuit coupled to a transmit circuit;

propagating the received signal to a receive circuit, the receive circuit comprising a switching circuit and a resistor circuit; and configuring the switching circuit based on DSL applications by opening and closing switches, which are located in the switching circuit, in a first manner if the unified DSL transceiver is used for asymmetric DSL over plain old telephone service (ADSL over POTS) applications.

13. The method of claim 12 for using a single transceiver for DSL applications, wherein the step of configuring the switching circuit based on DSL applications comprises the step of:

opening and closing the switches in a second manner if the unified DSL transceiver is used for symmetric DSL (SDSL) applications.

14. The method of claim 13 for using a single transceiver for DSL applications, wherein the step of configuring the switching circuit based on DSL applications comprises the step of:

opening and closing the switches in a third manner if the unified DSL transceiver is used for ADSL over integrated services digital network (ISDN) applications.

15. A unified DSL transceiver comprising:

means for receiving a signal into a line driver/transformer circuit, the line driver/transformer circuit coupled to a transmit circuit;

means for propagating the received signal to a receive circuit, the receive circuit comprising a switching circuit and a resistor circuit;

means for configuring the switching circuit based on DSL applications; and means for opening and closing switches, which are located in the switching circuit, in a first manner if the unified DSL transceiver is used for asymmetric DSL over plain old telephone service (ADSL over POTS) applications.

* * * * *